US008737775B2

(12) United States Patent
Webb

(10) Patent No.: US 8,737,775 B2
(45) Date of Patent: May 27, 2014

(54) SYSTEM AND METHOD FOR MONITORING DISPLACEMENT WITHIN ENERGIZED TAP CHANGER COMPARTMENTS

(75) Inventor: Geoff Webb, McKinney, TX (US)

(73) Assignee: Waukesha Electric Systems, Inc., Waukesha, WI (US)

( * ) Notice: Subject to any disclaimer, the term of this patent is extended or adjusted under 35 U.S.C. 154(b) by 857 days.

(21) Appl. No.: 12/295,937

(22) PCT Filed: Apr. 9, 2007

(86) PCT No.: PCT/US2007/008871

§ 371 (c)(1),
(2), (4) Date: Dec. 2, 2008

(87) PCT Pub. No.: WO2007/117696

PCT Pub. Date: Oct. 18, 2007

(65) Prior Publication Data

US 2009/0278544 A1 Nov. 12, 2009

Related U.S. Application Data

(60) Provisional application No. 60/789,887, filed on Apr. 7, 2006.

(51) Int. Cl.
*G01B 11/14* (2006.01)

(52) U.S. Cl.
USPC .......................................... 385/12; 324/416

(58) Field of Classification Search
USPC .......................................... 385/12; 324/416
See application file for complete search history.

(56) References Cited

U.S. PATENT DOCUMENTS

| | | | | |
|---|---|---|---|---|
| 3,594,631 A * | 7/1971 | Trachsel | 323/341 |
| 3,925,722 A | 12/1975 | Fohrhaltz et al. | |
| 4,532,499 A * | 7/1985 | Collin et al. | 340/644 |
| 4,900,151 A * | 2/1990 | Ulbers | 356/482 |
| 5,128,608 A * | 7/1992 | Ochi | 324/96 |
| 5,428,551 A | 6/1995 | Trainor et al. | |
| 5,619,121 A | 4/1997 | Trainor et al. | |
| 5,623,108 A * | 4/1997 | Kosugi et al. | 73/865.8 |
| 6,163,253 A * | 12/2000 | Yaron et al. | 340/436 |
| 6,446,027 B1 * | 9/2002 | O'Keeffe et al. | 702/183 |
| 6,868,711 B2 * | 3/2005 | Ebi | 73/7 |
| 7,145,760 B2 | 12/2006 | Stenestann et al. | |
| 7,319,309 B1 | 1/2008 | Cannon et al. | |
| 2001/0019494 A1 * | 9/2001 | Leijon et al. | 363/125 |
| 2004/0046563 A1 * | 3/2004 | Dominelli et al. | 324/420 |
| 2004/0047535 A1 * | 3/2004 | Ukrainczyk | 385/12 |
| 2009/0278544 A1 * | 11/2009 | Webb | 324/416 |

FOREIGN PATENT DOCUMENTS

| | | | |
|---|---|---|---|
| CN | 1751659 A | 3/2006 |
| JP | 4075225 A | 3/1992 |
| JP | 6001736 B | 1/1994 |
| JP | 7288068 A | 10/1995 |
| JP | 2000030578 A | 1/2000 |

* cited by examiner

*Primary Examiner* — Jennifer Doan
*Assistant Examiner* — Andrew Jordan
(74) *Attorney, Agent, or Firm* — Baker & Hostetler LLP

(57) ABSTRACT

A system and method of measuring displacement of energized components within a tap changer compartment. A fiber optic sensor assembly is provided within a transformer compartment. The sensor assembly monitors displacement of one or more energized components within the transformer compartment. The sensor assembly transmits information to a control box assembly that uses the information to output analog or digital signals, control signals, voltage and/or ampere measurements or other information.

18 Claims, 4 Drawing Sheets

SYSTEM AND METHOD FOR MONITORING DISPLACEMENT WITHIN ENERGIZED TAP CHANGER COMPARTMENTS

FIELD OF THE INVENTION

The invention relates generally to displacement monitors for energized tap changer compartments. More particularly, the invention relates to a fiber optic sensor that monitors displacement of components within energized tap changer compartments.

BACKGROUND OF THE INVENTION

A tap changer is a device fitted to power transformers for regulation of output voltage to required levels. This is normally achieved by changing the ratios of the transformers on the system by altering the number of turns in one winding of the appropriate transformer(s). Tap changers cause more failures and outages than any other component of a power transformer. Tap changer failures are categorized as electrical, mechanical or thermal. Many failures begin because of mechanical problems with contacts, transition resistors or insulation breakdowns.

It is important to monitor the condition of a tap changer to potentially avoid failures or outages of the transformer. Historically, to determine a tap changer's condition, a tap changer compartment would be de-energized and physical measurements of components of the tap changer would be taken. Physical observation of the components would also assist in determining the condition of the tap changer.

Some systems have been developed that enable tap changer to be evaluated on-load without affecting its normal operation and requiring de-energizing. These systems use a combination of acoustic emission and vibration techniques (AE/VA). Acoustic Emission assessment is based on the fact that no acoustic activity is expected from inside the tap changer compartment if the tap changer is not being operated and it is in good condition. Vibration techniques include obtaining a signature of one operation of the tap changer and performing a comparison of its characteristics (time, amplitude, energy, etc.) with another signature obtained some time in the future or with another unit having the same operation. When using a combination of both techniques, evaluation of the condition of the tap changer in an off-load state is performed using acoustic emission whereas on-load evaluation is made using the vibration technique.

These systems, however, have drawbacks. For example, the vibration technique may require complex analysis that is costly to perform. Additionally, these systems do not monitor displacement of components within the tap changer. Displacement monitoring provides a good indication of how much wear has occurred to a tap changer component. Furthermore, tap changer compartments contain oil that impedes various types of sensors from obtaining accurate measurements.

These and other drawbacks exist.

SUMMARY OF THE INVENTION

According to one embodiment of the invention, a system and method are provided that measure displacement of components of a transformer. According to the invention, a sensor assembly is provided within a transformer compartment. The sensor assembly is used to monitor displacement of one or more energized components within the transformer compartment. The sensor assembly preferably uses fiber optics to measure displacement of the components. The sensor assembly transmits information to a control box assembly that uses the information to output analog or digital signals, control signals, voltage and/or ampere measurements or other information.

According to one embodiment of the invention, a system and method are provided that measure displacement of components of an energized tap changer. The invention uses a sensor assembly provided within a tap changer compartment. According to one embodiment of the invention, the sensor assembly is attached to an interrupter assembly of a vacuum interrupter protection system. The sensor assembly may be mounted to a sensor plate and positioned above a reflective plate provided on a mounting plate. The sensor assembly is preferably positioned such that light emitted from the sensor assembly is reflected off of the reflective plate and back to the sensor assembly. Information regarding the light reflected back to the sensor assembly is communicated to a control box assembly located outside of the tap changer compartment and in communication with the sensor assembly. The sensor assembly and the control box assembly are preferably in communication over a fiber optic cable assembly. The fiber optic cable assembly preferably passes through a tank wall of the tap changer compartment using feed through fittings.

The fiber optic cable assembly provides the information to the control box assembly using the converter. The converter processes the information to determine whether the mounting plate has been displaced. Based on this determination, the control box may output one or more signals using, for example, a programmable logic controller (PLC).

In accordance with another embodiment of the invention, a system and method are provided that monitor an operating state of a vacuum bottle of a vacuum interrupter protection system. The invention uses an optical displacement sensor assembly that is provided within a tap changer compartment. The sensor assembly monitors a state of a valve of the vacuum bottle by optically locating a position of the valve. Based on this information, a control box assembly that is in communication with the sensor assembly determines whether the valve of the vacuum bottle is in an open position or a closed position. The valve is positioned in a resting position for each operating state. Over time, these resting positions change. This change in resting positions indicates an amount of wear endured by the valve. The control box assembly determines how much displacement has occurred in the resting positions based on the information provided by the sensor assembly. This determination assists in determining whether a vacuum bottle needs to be replaced to possibly prevent failure of the vacuum bottle.

There has thus been outlined, rather broadly, certain embodiments of the invention in order that the detailed description thereof herein may be better understood, and in order that the present contribution to the art may be better appreciated. There are, of course, additional embodiments of the invention that are be described below and form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Figure 1:
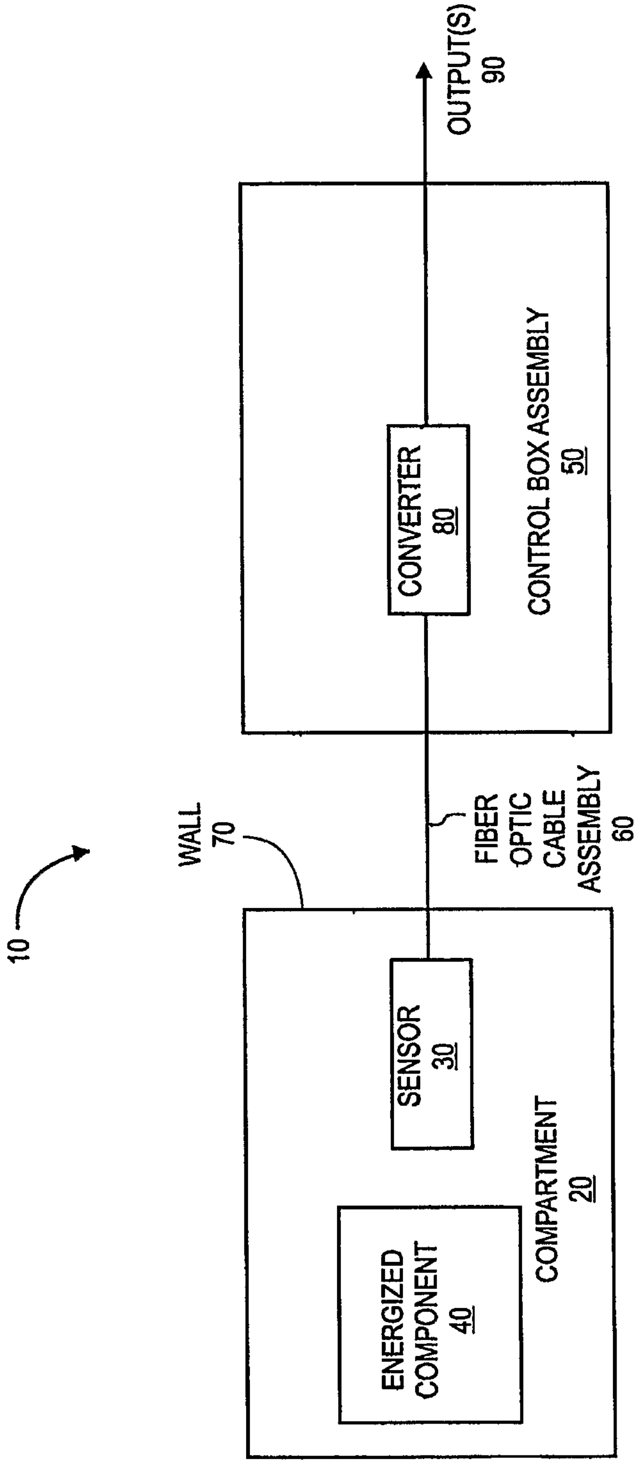
FIG. 1 is an illustration of a system of monitoring displacement of energized components within a transformer compartment according to one embodiment of the invention.

The invention is described with reference to the drawing figures, in which like reference numerals refer to like parts throughout. FIG. 1 illustrates a system 10 a system and method of monitoring displacement of energized components in a transformer compartment 20 according to one embodiment of the invention.

According to the invention, a sensor assembly 30 is provided within the transformer compartment 20. The sensor assembly 30 monitors displacement of one or more energized components 40 within the transformer compartment 20. The sensor assembly 30 preferably uses fiber optics to measure displacement of the components 40. The sensor assembly 30 emits light that is reflected off of the energized components 40 and back to the sensor assembly 30 to obtain displacement measurements. The sensor assembly 30 transmits information to a control box assembly 50. The information is preferably transmitted over a fiber optic cable assembly 60. The fiber optic cable assembly 60 may pass through a tank wall 70 of the transformer compartment 20.

The control box assembly 50 receives the information using a converter 80. The converter 80 uses the measurements to provide one or more outputs 90. The outputs 90 may be, for example, analog or digital signals, control signals, voltage and/or ampere measurements or other information. These signals or other information may be used to control portions of the transformer or provide information regarding wear of a component 40 which is described in more detail below.

Figure 2:
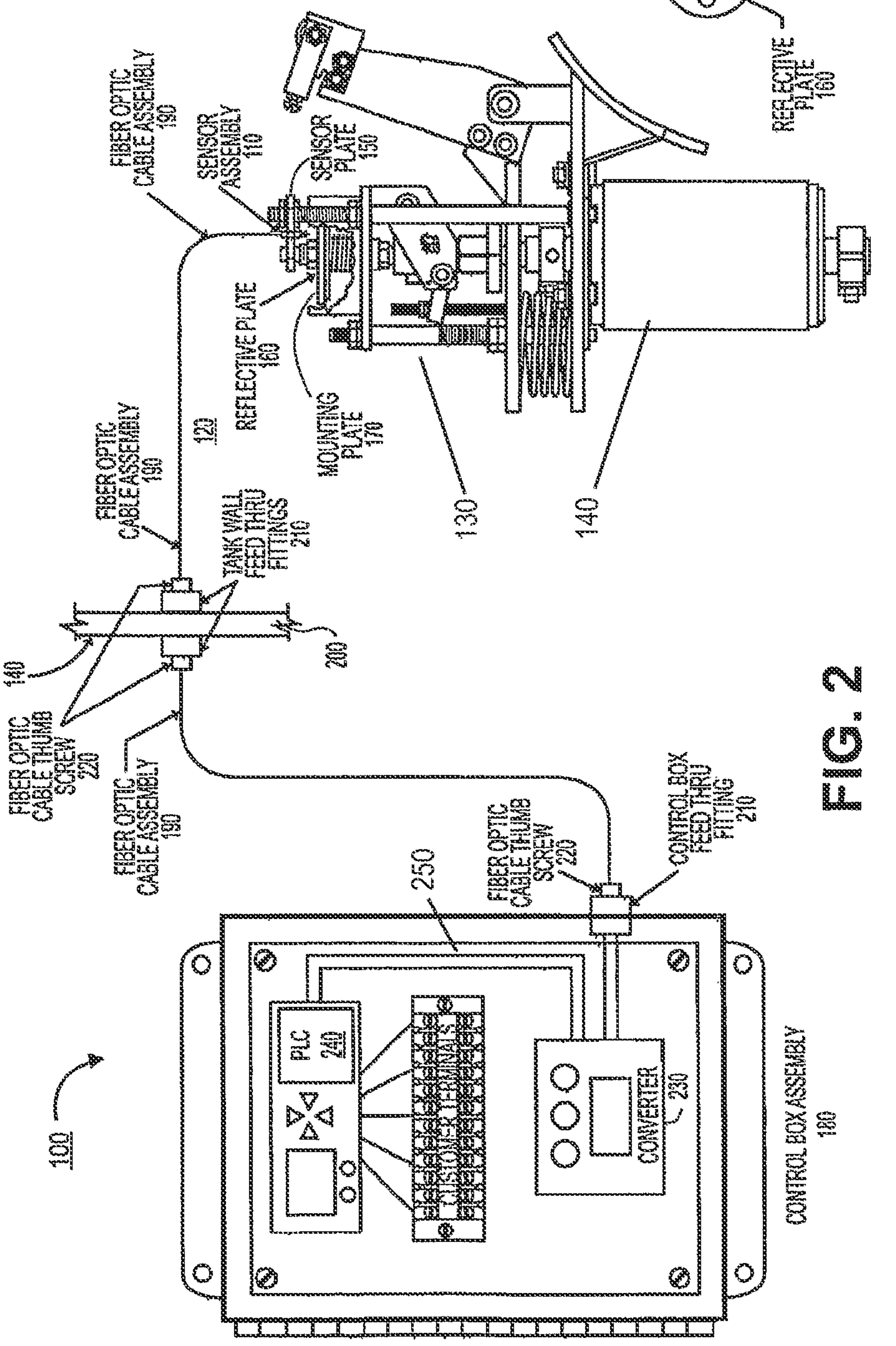
FIG. 2 is an illustration of a system of monitoring displacement of energized components within a transformer compartment according to one embodiment of the invention.
Figure 3:
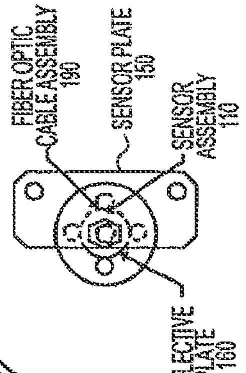
FIG. 3 is a top view of a sensor assembly mounted to an interrupter assembly according to one embodiment of the invention.

FIGS. 2 and 3 illustrate a system 100 of measuring displacement of energized tap changer components and a sensor assembly 110 mounted within a tap changer compartment 120, respectively, according to one embodiment of the invention. The invention uses a sensor assembly 110 provided within a tap changer compartment 120 of a transformer. The sensor assembly 110 may be attached to an interrupter assembly 130 of a vacuum interrupter protection system 140. The sensor assembly 110 may be mounted to a sensor plate 150 and positioned above a reflective plate 160 provided on a mounting plate 170. The sensor assembly 110 may be used to provide information regarding an operating condition of the interrupter assembly 130.

The sensor assembly 110 is preferably positioned such that light emitted from the sensor assembly 110 is reflected off of the reflective plate 160 and back to the sensor assembly 110. Information regarding the light reflected back to the sensor assembly 110 is communicated to a control box assembly 180 located outside of the tap changer compartment and in communication with the sensor assembly 110. This information preferably relates to displacement measurements of the mounting plate 170 within the interrupter assembly 130. Displacement measurements assist in determining an amount of wear that has occurred to the interrupter assembly 130. The sensor assembly 110 and the control box assembly 180 are preferably in communication over a fiber optic cable assembly 190. The fiber optic cable assembly 190 preferably passes through a tank wall 200 of the tap changer compartment using feed through fittings 210 and fiber optic cable thumb screws 220.

The fiber optic cable assembly 190 preferably enters the control box assembly 180 using feed through fittings 210 and fiber optic cable thumb screws 220. The fiber optic cable assembly 190 is received by the control box assembly 180 using a converter 230. The converter 230 uses the information received from the sensor assembly 110 to determine displacement of the mounting plate 170. The displacement assists in determining an amount of wear that has occurred to the interrupter assembly 130. Based on this determination, die converter 230 transmits signals to a programmable logic controller 240 that provides one or more outputs 250. The outputs 250 may be used to control other components of the transformer or provide information regarding an operating condition of the interrupter assembly 130.

Figure 4:
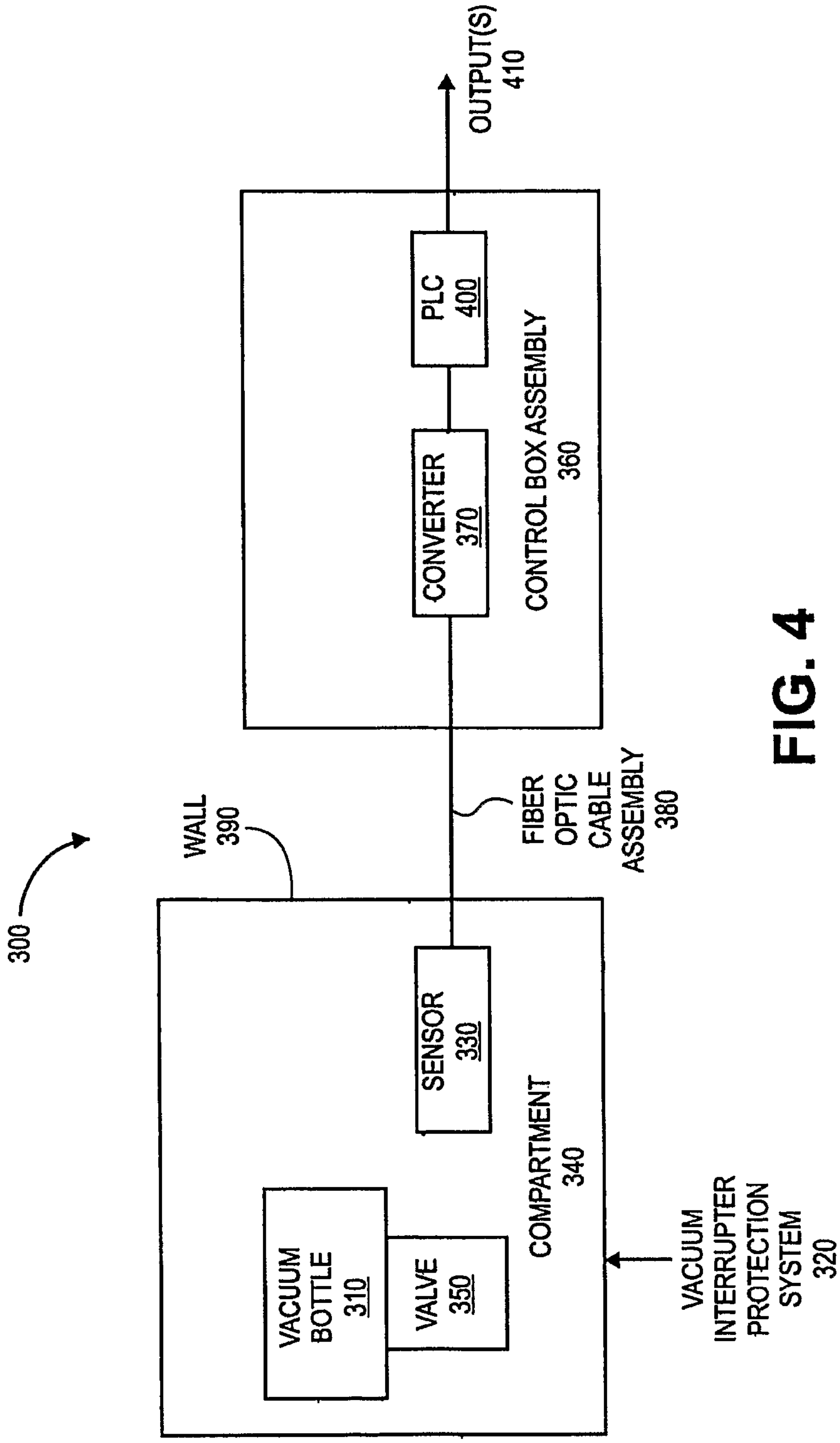
FIG. 4 is an illustration of a system of monitoring displacement of a vacuum bottle valve according to one embodiment of the invention.

FIG. 4 illustrates a system 300 of monitoring an operating state of a vacuum bottle 310 of a vacuum interrupter protection system 320 of a transformer. The system 300 uses an optical displacement sensor assembly 330 that is provided within a tap changer compartment 340. The sensor assembly 330 monitors a state of a valve 350 of the vacuum bottle 310 by optically locating a position of the valve 350. Based on this information, a control box assembly 360 that is in communication with the sensor assembly 330 determines whether the valve 350 is in an open position or a closed position. The information communicated by the sensor assembly 330 may be received by the control box assembly 360 using a converter 370. The sensor assembly 330 and the converter 370 are preferably in communication using a fiber optic cable assembly 380. The fiber optic cable assembly 380 may pass through a tank wall 390 of the vacuum interrupter protection system 320.

The valve 350 is positioned in a resting position for each operating state. Over time, these resting positions change. This change in resting positions indicates an amount of wear endured by the valve 350. The control box assembly 360 determines how much displacement has occurred in the resting positions based on the information provided by the sensor assembly 330. This determination assists in determining whether a vacuum bottle 310 needs to be replaced to possibly prevent failure of the vacuum interrupter protection system 320.

The converter 360 transmits signals to, for example, a programmable logic controller (PLC) 390. The PLC 390 provides one or more outputs 400 that may be used to control other components of a transformer or data regarding an operating condition of the vacuum bottle 310.

Figure 5:
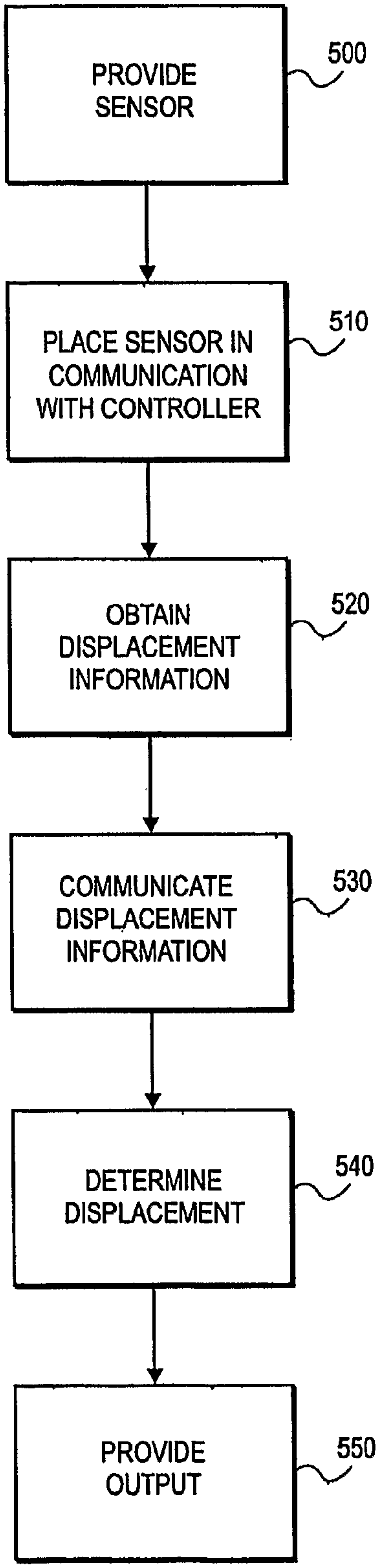
FIG. 5 is a flowchart of a method of monitoring displacement of energized components within a tap changer or transformer compartment according to one embodiment of the invention.

FIG. 5 illustrates a method of monitoring displacement within an energized tap changer compartment. A sensor capable of operating within an energized tap changer compartment is provided and mounted within the tap changer compartment, step 500. Preferably, the sensor is a fiber optic sensor and positioned adjacent a component that is capable of energizing.

The sensor is placed in communication with a controller such as, for example, a control box assembly, step 510. Preferably, the sensor communicates with a converter of the controller over a fiber optic cable assembly. The sensor preferably obtains displacement information for the component while the component is energized, step 520. The sensor communicates displacement information to the controller using the fiber optic cable assembly, step 530. Based on the information received from the sensor, the converter determines an amount of displacement experienced by the component within the tap changer compartment, step 540. The converter then provides an output based on the amount of displacement determined, step 550. The output may be, for example, an alert that the component has reached its critical point, a notification of an amount of wear experienced by the component or other information.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system of monitoring displacement of energized tap changer components comprising:

a sensor, operating within an energized tap changer compartment, to measure displacement of an energized tap changer component, the sensor being arranged exterior to the energized tap changer component;

a converter in communication with the sensor;

an output, in communication with the converter, that outputs information based on data received by the converter from the sensor, the information indicating an amount of wear of the energized component; and a reflective plate attached to the exterior of the energized tap changer component and wherein the sensor measures a change in a displacement of the reflective plate to determine wear of the energized tap changer component.

2. The system of claim 1, wherein the sensor comprises a fiber optic sensor.

3. The system of claim 1, wherein the output outputs at least any one of a command to open or close a contact, voltage signals, ampere signals, analog signals and digital signals.

4. The system of claim 1, further comprising a programmable logic controller in communication with the converter and the output.

5. The system of claim 1, wherein the sensor is mounted to a sensor plate on the exterior of the energized tap changer component.

6. The system of claim 1, wherein the reflective plate is mounted on a mounting plate of the energized tap changer component.

7. The system of claim 1, further comprising a fiber optic cable that extends out of the energized tap changer compartment.

8. A system of monitoring displacement of energized tap changer components comprising:

sensing means for measuring displacement of an energized component within an energized tap changer compartment, the sensing means being arranged on an exterior of the energized tap changer component;

converting means, in communication with the sensing means, for converting information received from the sensing means into at least one signal;

outputting means, in communication with the converting means, for outputting information based on data received by the converting means from the sensing means, the information indicating an amount of wear on the energized component; and a reflective means attached to the exterior of the energized tap changer component for reflecting light emitted by the sensing means and wherein the sensing means measures a change in a displacement of the reflective means to determine wear of the energized component within the energized tap changer compartment.

9. The system of claim 8, wherein the sensing means comprises a fiber optic sensor.

10. The system of claim 8, wherein the output outputs at least any one of a command to open or dose a contact, voltage signals, ampere signals, analog signals and digital signals.

11. The system of claim 8, further comprising programmable logic controller means for communicating output signals received by the converting means.

12. The system of claim 8, wherein the sensing means is mounted to a sensor plate on the exterior of the energized tap changer component.

13. The system of claim 8, wherein the reflective means is mounted on a mounting plate of the energized tap changer component.

14. The system of claim 8, further comprising a fiber optic cable that extends out of the energized tap changer compartment.

15. A method of monitoring displacement of energized tap changer components comprising:

using a sensor operating within an energized tap changer compartment, the sensor being arranged on an exterior of an energized tap changer component and additionally arranging a reflective plate of the sensor on the exterior of the energized tap changer component;

enabling communication between the sensor and a controller;

measuring displacement information for the energized tap changer component;

transmitting the displacement information from the sensor to the controller;

determining an amount of displacement based on the displacement information;

providing an output based on the amount of displacement determined; and determining an amount of wear of the energized tap changer component based on the information provided by the sensor.

16. The method of claim 15, wherein the sensor comprises a fiber optic sensor.

17. The system of claim 15, wherein the sensor is mounted to a sensor plate on the exterior of the energized tap changer component.

18. The system of claim 15, wherein the transmitting comprises transmitting on a fiber optic cable that extends out of the energized tap changer compartment.

* * * * *